Oct. 21, 1947.    I. TELLES    2,429,245
WASHER CUTTER
Filed Aug. 29, 1945

INVENTOR
IVEY TELLES
BY
Ralph L. Chappell
ATTORNEY

Patented Oct. 21, 1947

2,429,245

UNITED STATES PATENT OFFICE 2,429,245

WASHER CUTTER

Ivey Telles, Portsmouth, N. H.

Application August 29, 1945, Serial No. 613,406

7 Claims. (Cl. 164—32)

(Granted under the act of March 3, 1883, as amended April 30, 1928; 370 O. G. 757)

This invention relates to a washer forming machine and more particularly to a tool for use in such a machine, the tool being characterized by a novel ejector for removing finished washers from the tool.

Washers are commonly made by impressing into a piece of sheet material a die which makes two cuts simultaneously. One cut forms a plug which when removed from the washer leaves the desired hole in the center thereof, the periphery of the washer being formed by the second cut. A series of such double cuts may be made until the die will hold no more material, and then the washers and plugs are pushed out of the die.

When a soft, felted material is used, its resilience and fibrous nature cause the washers and plugs to remain together after being ejected from the die, thereby necessitating another operation to remove the plugs from the washers.

In view of the foregoing it is an object of the invention to provide a washer forming machine and tool in the use of which the washers are ejected without the plugs.

To this end, the invention provides a washer cutting machine having a cutter with inner and outer cutting edges adapted to form a washer surrounding a plug, and an ejector comprising two members one engaging the plug and the other engaging the washer, the members being movable one in advance of the other outwardly beyond the cutting edges to insure that the washer and plug are ejected separately.

In the illustrated tool, the washer is ejected by a sleeve which is so driven, by a lost motion connection with a plunger for ejecting the plug, that the ejection of the washer does not begin until the ejection of the plug has been completed.

This ejecting movement is one of relative movement between the cutter and ejector. The ejector may be held relatively fixed while the cutter is retracted to provide the ejecting movement, or the ejector itself can be moved relatively to the cutter to effect the same result.

With the above and other objects and features in view, the invention will now be described with reference to the accompanying drawings which illustrate a preferred embodiment of the invention and will be pointed out in the claims.

Figure 1:
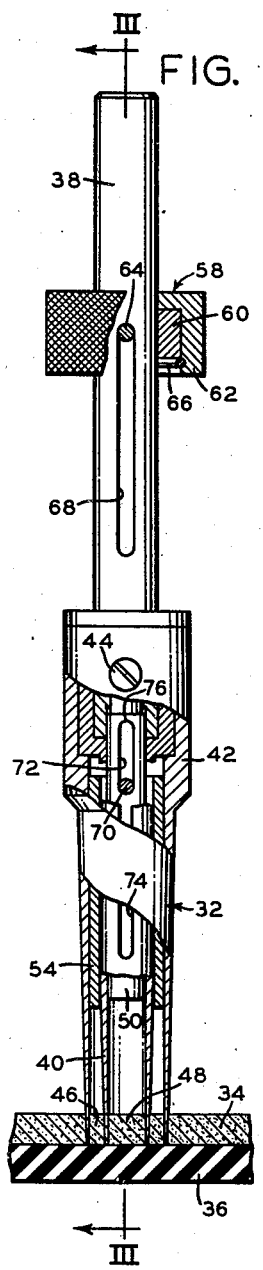
Fig. 1 is a side elevation of an illustrative machine having a washer forming tool constructed in accordance with the invention.

The illustrated machine is an adaptation of a typical bench drill press comprising a base 10 (Fig. 1) carrying an upwardly extending pedestal 12 on which is mounted for vertical adjustment a bracket 14 adapted to be clamped to the pedestal in any desired position by setting up a screw 16. A quill 18 is mounted for vertical movement in the bracket 14 under the control of a hand lever 20 toward and away from the base 10. A shaft 22 carrying a chuck 24 is rotatably mounted in quill 18 and has a cone pulley 26 keyed thereto at its upper end. The pulley 26 is driven by a belt 28 which is driven by a motor 30 mounted on the rear side of the bracket 14.

The illustrated washer forming tool 32 is adapted to be held and rotated by the chuck 24 slightly elevated above the base 10, so as to allow a piece of sheet material 34, supported by a pad 36, to be freely moved on the base 10 underneath the tool 32.

Figure 2:
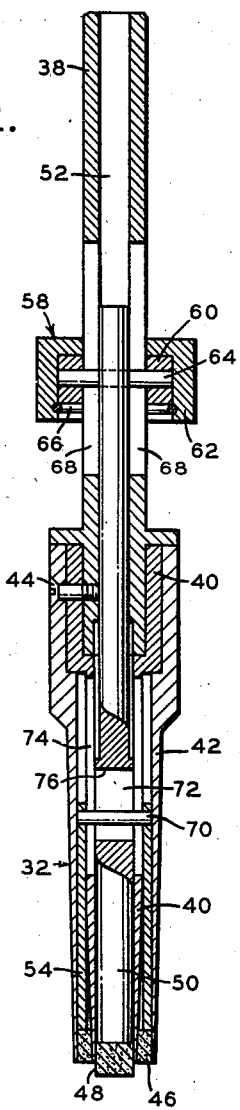
Fig. 2 is an elevation of the tool illustrating the forming of a washer and plug, certain parts of the tool being broken away and shown in cross section.

The tool comprises a shaft 38 (Figs. 2 and 3), the upper end of which is adapted to be gripped by the jaws of the chuck 24. To the lower end of the shaft is closely fitted a tubular inner cutter 40, the lower portion of which is substantially cylindrical and has a diameter equal to the desired internal diameter of the washer to be formed. An outer tubular cutter 42 at its upper end closely fits the outer side of the inner cutter 40 and is mounted coaxially with respect to the latter and the shaft 38. The cutters 40 and 42 are secured in assembled relation on the shaft 38 by a screw 44 which is threaded into the shaft. The lower portion of the cutter 42 is also substantially cylindrical, has a diameter equal to the desired outside diameter of the washer to be formed, and has a cutting edge disposed at the same level as that of the inner cutter 40.

It will now be apparent that by turning the hand lever 20 so as to cause the cutters 40 and 42 to penetrate the material 34, a washer 46 will be formed between the cutters, and a plug 48 will be formed within the inner cutter 40. When the tool 32 is retracted away from the material 34, the washer and plug will be removed therefrom by the tool. Further retractive movement of the tool 32 will result in the successive ejection of the plug and washer from the tool by the operation of an ejector which will now be described.

The illustrated ejector comprises two principal elements, a plunger 50 which is slidably mounted within the inner cutter 40 and within an axially extending bore 52 in the shaft 38, and a sleeve 54 which is mounted for limited axial movement with respect to the plunger 50 between the inner and outer cutters 40 and 42. When the ejecting operation is to be performed by the retractive movement of the tool 32, the plunger 50 is held relatively fixed axially thereof by connections which comprise an arm 56 adapted to be fixed to the pedestal 12 in any desired position heightwise thereof and a swivel unit 58 which supports the plunger 50 and is clamped to the outer end of the arm 56.

The unit 58 comprises a collar 60 and a sleeve 62 adapted to rotate freely with respect to each other and to allow free sliding action of the shaft 38 within them. A pin 64 connects the collar 60 to the plunger 50, and a spring-retainer 66 holds the collar 60 within the sleeve 62. The shaft 38 has an elongated slot 68 extending axially thereof through which the pin 64 extends to permit a considerable amount of axial movement between the shaft and the plunger 50 for a purpose to be explained later.

The operation of the ejecting sleeve 54 is controlled by the plunger 50 to which the sleeve is connected by a lost motion connection comprising a pin 70, which is fixed on the sleeve and which is received in an axially elongated slot 72 formed within the plunger 50. The inner cutter 40 is also provided with oppositely disposed slots 74 for receiving the pin 70 to allow unobstructed axial movement of the sleeve 54 with respect to the plunger 50.

Figure 3:
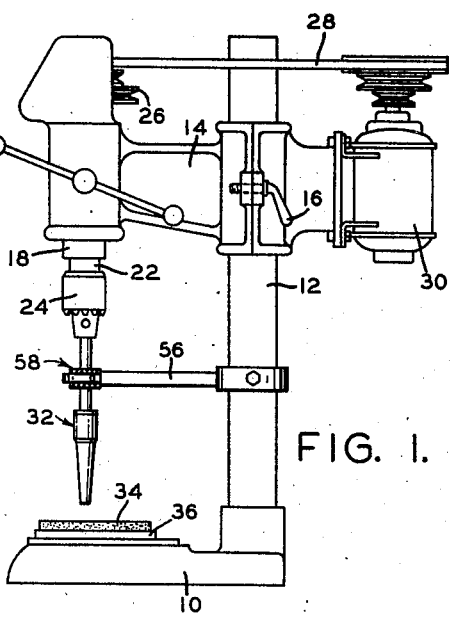
Fig. 3 is a sectional elevation of the tool, the section being taken along the line III—III of Fig. 2, illustrating one stage of the ejection of the plug from the tool.
Figure 4:
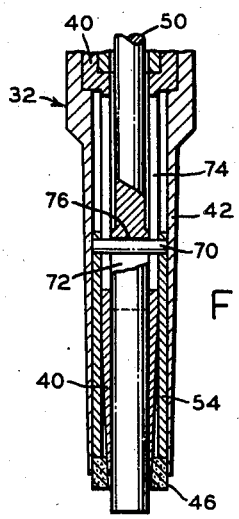
Fig. 4 is a fragmentary sectional view similar to Fig. 3 illustrating the relation of the parts of the tool after the plug has been ejected and the ejection of the washer has begun.

Having formed a washer 46 and a plug 48 as described above, the separate ejection of the washer and plug from the tool 32 is effected automatically by retracting the quill 18 to the upper limit of its movement, the plunger 50 being held stationary. After the plug 48 has been raised into engagement with the lower end of the plunger 50, further retractive movement of the tool causes the plug to be ejected from within the inner cutter 40. Throughout this ejecting operation of the plunger 50, the sleeve 54 is moved upwardly relatively to the plunger by the washer 46 the lower side of which remains flush with the lower ends of the cutters 40 and 42, as illustrated in Fig. 3. This movement of the sleeve with respect to the plunger is permitted by the slot 72 which receives the pin 70. Shortly after the time when the plunger projects outwardly beyond the cutting edge of the inner cutter 40 and the plug 48 is ejected from the tool, the pin 70 engages a shoulder 76 (Fig. 4) at the upper end of the slot 72 whereby further upward movement of the sleeve relatively to the plunger is prevented. It will now be apparent that further retractive movement of the cutters 40 and 42 will cause the sleeve 54 to eject the washer 46 from the tool. Thus, the plug 48 and the washer 46 are ejected separately from the tool and in the order named.

If desired, the arm 56 can be dispensed with, in which case the plunger 50 and sleeve 54 may be moved downwardly relatively to the cutters 40 and 42. To perform this operation manually, the operator, after forming the washer and retracting the tool 32, may grip the sleeve 62 and push downwardly on it thereby ejecting the plug 48 first and later the washer 46, after the shoulder 76 has been brought into engagement with the pin 70.

While the ejecting operation has been described above as following immediately the forming of one washer, it is apparent that a number of washers up to the capacity of the tool may be formed before any are ejected. In this connection, the length of the slot 68 permits the plunger 50 and sleeve 54 to be retracted well above the cutting edges of the cutters 40 and 42, as illustrated in Fig. 3. Space is thus formed to receive a series of washers. By a complete operation of the ejector, this series of washers may be ejected with one relative movement between the cutter and the ejector whether this relative movement be the result of a retractive movement of the tool relatively to the ejector, or a downward movement of the ejector relatively to the tool. In either case, the plugs and washers will be ejected alternately from the tool at different times so that it will be unnecessary to remove the plug from any washer as a separate operation after the washers have been ejected.

The invention described herein may be manufactured and used by or for the Government of the United States of America for government purposes without the payment of any royalty thereon or therefor.

What is claimed is:

1. In a washer forming tool, a rotatable shaft having an axially extending bore, inner and outer tubular cutters mounted on said shaft coaxially therewith, a plunger mounted to slide axially of said shaft within said bore, a sleeve mounted between said cutters for movement axially thereof, a pin connecting said sleeve and plunger, said inner cutter and plunger having axially extending slots adapted to receive said pin, said plunger having a shoulder adapted to be engaged by said pin as said plunger is moved outwardly of said inner cutter beyond the cutting edge thereof, whereby said sleeve is driven by said plunger during further movement of said plunger out of said inner cutter.

2. In a washer forming tool, a hollow rotatable shaft, inner and outer cutters mounted on said hollow shaft, a first ejecting member mounted to slide within said hollow shaft, a second ejecting member mounted between said inner and outer cutters and movable relative thereto, means connecting said first and second ejecting members, said inner cutter and said first ejecting member having openings adapted to receive said connecting means, said first ejecting means being adapted to be engaged by said connecting means when said first ejecting means is moved outwardly of said inner cutter, whereby said second ejecting means is driven by said first ejecting means during further outward movement of said first ejecting means.

3. Apparatus as in claim 1 and including means slidably positioned upon said shaft and adapted to cause movement of said plunger.

4. Apparatus as in claim 1 and including an opening in said shaft, a collar positioned over said shaft in the region of said shaft opening, means extending through said shaft opening securing said plunger and said collar.

5. Apparatus as in claim 1 and including a slot in said shaft extending axially thereof, a collar slidably disposed over said shaft in the region of said axially extending shaft slot, a pin connection extending through said shaft slot and securing said plunger and said collar, and a rotatable sleeve positioned over said collar, whereby relative axial movement of said rotatable sleeve and said shaft provides corresponding relative axial movement of said plunger and said inner cutter.

6. A washer forming tool comprising, in combination, inner and outer substantially tubular cutters, a first ejecting member operative within said inner tubular cutter, a second ejecting member operative between said inner and outer tubular cutters, a pin connecting said first and second ejecting members, said inner cutter and said first ejecting member having slots adapted to receive said pin, said first ejecting member being adapted to engage said pin as said first ejecting member is moved outwardly of said inner cutter beyond the cutting edge thereof, whereby said second ejecting member is driven by said first ejecting member during continued movement of said first ejecting member out of said inner cutter.

7. Apparatus as in claim 2 and including means slidably positioned upon said hollow rotatable shaft engaging said first ejecting member and adapted to cause movement thereof.

IVEY TELLES.

REFERENCES CITED

The following references are of record in the file of this patent:

UNITED STATES PATENTS

| Number | Name | Date |
|---|---|---|
| 257,311 | Gallagher | May 2, 1882 |
| 1,048,282 | Bogdanffy | Dec. 24, 1912 |
| 557,554 | Clemens | Apr. 7, 1896 |
| 885,237 | Frothingham | Apr. 21, 1908 |
| 1,806,266 | Sawle | May 19, 1931 |
| 2,275,525 | Halmrast | Mar. 10, 1942 |
| 1,109,596 | Rau | Sept. 1, 1914 |

FOREIGN PATENTS

| Number | Country | Date |
|---|---|---|
| 438,937 | Germany | Dec. 30, 1926 |